3,614,923
FOOD WARMER
Neal W. Thompson, McKees Rocks, Pa., assignor to
Small Business Administration
Filed July 16, 1969, Ser. No. 842,268
Int. Cl. A47j 36/24
U.S. Cl. 99—234 R    4 Claims

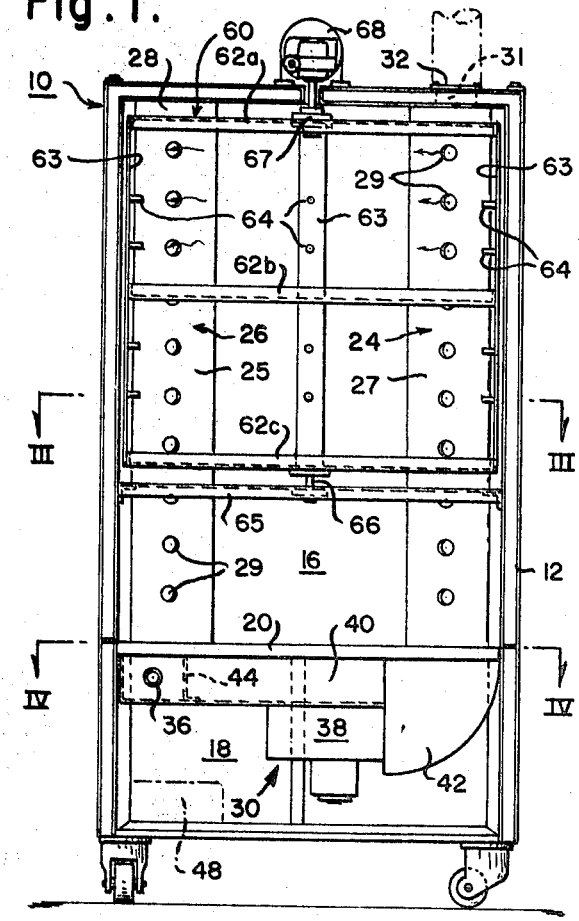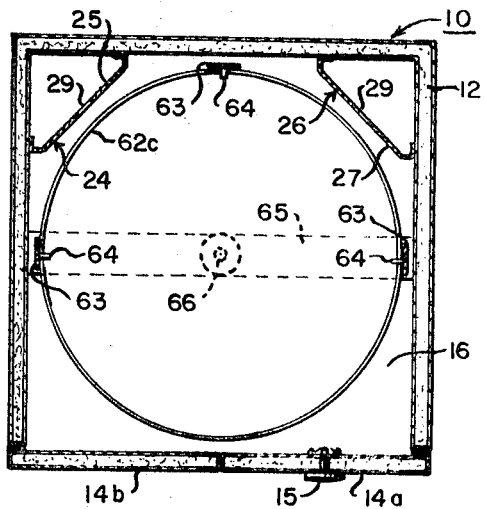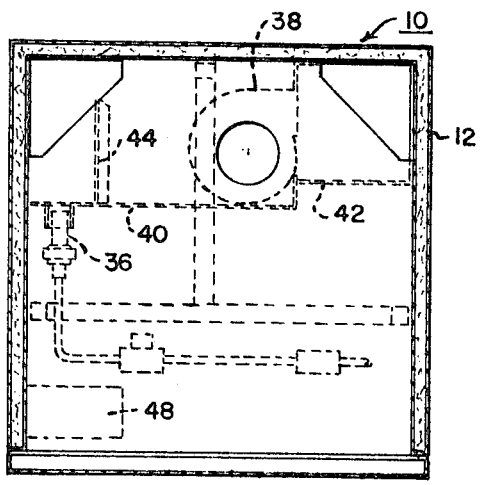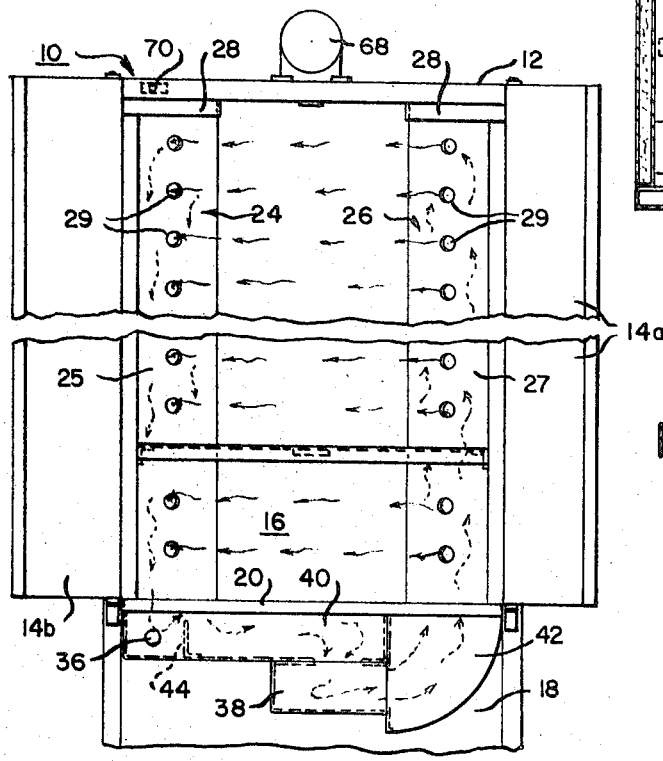
Oct. 26, 1971   N. W. THOMPSON   3,614,923
FOOD WARMER
Filed July 16, 1969   2 Sheets-Sheet 1
Fig. 1.
Fig. 2.
Fig. 3.
Fig. 4.
INVENTOR
Neal W. Thompson INVENTOR
Neal W. Thompson

United States Patent Office 3,614,923
Patented Oct. 26, 1971

ABSTRACT OF THE DISCLOSURE

A food warmer including an upright cabinet having a warming and storage compartment, and a closed forced air heating system for providing moisture regulated heated air to the warming and storage compartment whereby food is kept warm under a controlled atmosphere.

---

This invention relates to a food warmer in which heated air having controlled moisture content is provided to the warming and storage compartment thereby resulting in improved warming and storage of food.

It is common practice in high capacity prepared food outlets, such as restaurants, schools, and the like, to cook or bake certain foods and then place them in food warmers prior to serving them. This is a desirable practice since it allows the food to be prepared safely in advance of the need for that food. In addition, some foods, such as fried chicken, for example, gain flavor by setting for a period of time, and thus should be placed in a food warmer before being consumed. A problem, however, with storing food in a warmer is that it will tend to either gain or lose moisture depending on the nature of the warming atmosphere. With fried chicken for example, if it gains moisture it will become very dark and unappetizing in appearance; and if it loses moisture it will dry and lose its taste. In the case of rolls or bread, too much moisture will result in a soggy product while not enough moisture will cause the product to have an excessively hard crust. Accordingly, it is necessary for the proper warming and storing of food to maintain a moisture controlled warming atmosphere. This invention does just that, and does it with a highly efficient and simple arrangement of elements. Before getting into this invention the present state of the food warmer art will be briefly outlined. The food warmer predominately used today uses a so-called open forced air heating system in which air is heated by an electric resistance heater. The open heating system continuously draws in fresh air, heats it, passes it over the food, and exhausts it. Also, an unregulated water supply, usually in the form of a pan of water, is disposed in the heated air stream in order to give the air a moisture content. This electric open heating system has several inherent problems. The chief problem is that the moisture content in the heated air cannot be properly controlled. This is caused by a combination of two factors— one is that fresh air is being constantly put into the system, and the other is that it takes too long for the electrical heater to heat the air to its desired temperature. If the incoming air is very moist which is often the case in kitchens, it will pick up additional mosture from the water supply and become heavly moisture laden to the detriment of the product being warmed. When the incoming air is cold compared with the desired temperature of the heated air, the electrical heater cannot heat the cold air fast and the result is that the air in the warmer cools and moisture condenses on the cabinet and the food. Additionally, in the case of cold air, the air in the warmer may never reach the desired warming temperature and the food will not be properly warmed. Attempts have been made to overcome the open heated air systems by making warmers having closed systems (i.e.

systems in which heated air is recirculated through duct work about the confines of the warmer cabinet). No known closed system food warmer exists in the market today, and the known past designs were very complicated in that the duct work followed elaborate serpentine paths. The food warmer of this invention overcomes those problems set out above by providing a simply constructed food warmer having a closed forced air heating system. More specifically, and in preferred form, I provide a food warmer comprising: an upright cabinet having a food warming and storage compartment with an open front section and an adjacent utility compartment; door means on the cabinet for closing and opening the front section; support means in the cabinet disposed in the warming and storage compartment for supporting food trays, baskets, or the like; and a closed forced air heating system including first and second duct means generally oppositely disposed to each other in the cabinet throughout at least a major portion of the warming and storage compartment and openly communicating with the utility compartment, each of the duct means being provided with a series of spaced openings extending over a major portion of the surface thereof; forced air heating means, preferably, gas burning, disposed in the utility compartment with the pressure side thereof communicating with the first duct means and the exhaust side thereof communicating with the second duct means for supplying heated air to the warming and storage compartment.

Other details and advantages of the invention will become apparent as the following descriptions of certain present preferred embodiments thereof proceed.

In the accompanying drawing I have shown certain present preferred embodiments of this invention in which:

FIG. 1 is a longitudinal view partly in section of a food warmer embodying one form of the present invention showing, among other things, a rotating food tray holder;

FIG. 2 is a partial front view of the food warmer of FIG. 1 without the rotating food tray hold showing further details of construction;

FIG. 3 is a view taken along the line III—III of FIG. 1;

FIG. 4 is a view taken along the line IV—IV of FIG. 1;

Figure 6:
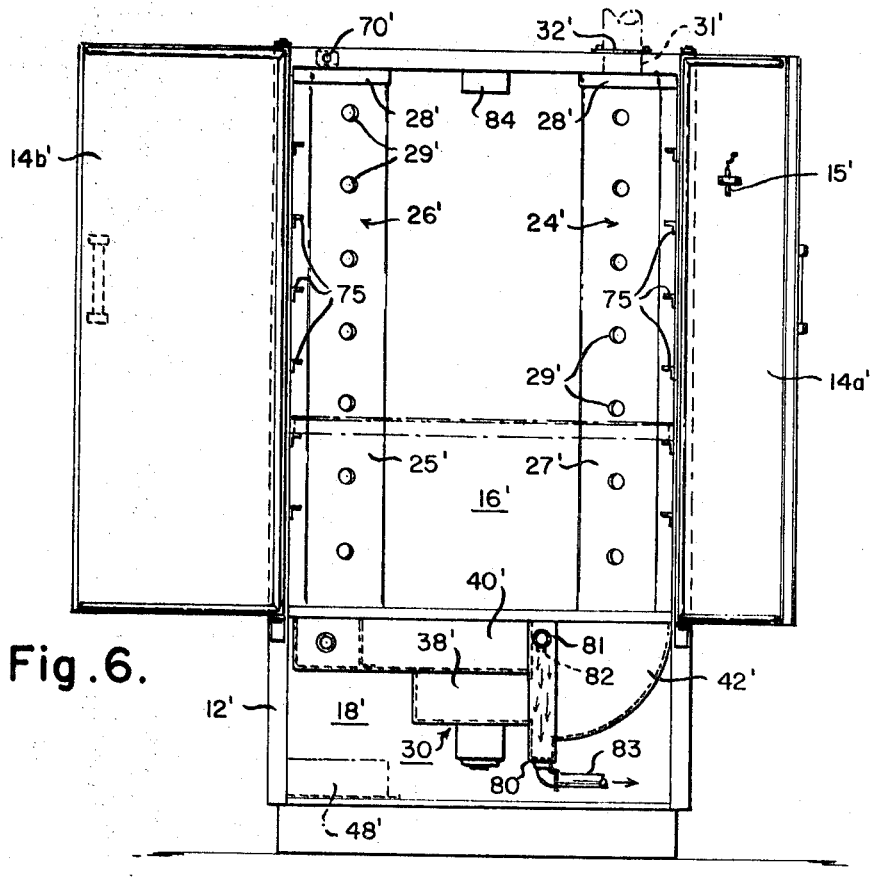
FIG. 6 is a longitudinal view partly in section of a food warmer embodying another form of the present invention.
Figure 5:
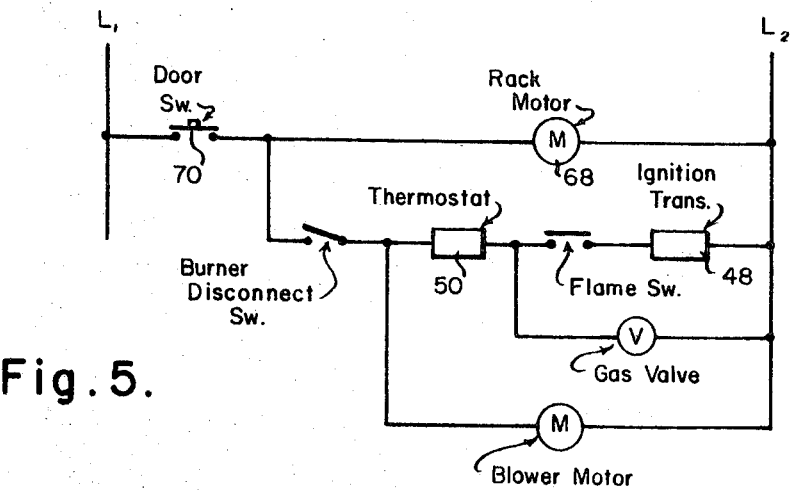
FIG. 5 is a schematic diagram of a typical electrical wire circuit for use with the present invention.

Referring now to the drawings wherein like reference numerals refer to like parts throughout the various views, 10 generally designates a food warmer including a caster supported upright cabinet, 12 of a generally square cross-section formed from suitable sheet metal, such as stainless steel, and suitably heat insulated. The cabinet 12 has an open front enclosed by a pair of appropriately sealed doors 14 a and b suitably hinged to the cabinet. The right door is provided with a temperature indicator 15 connected with a thermocouple disposed on the interior of the door. The interior of the cabinet 12 is divided into a pair of compartments, namely, a warming and storage compartment 16 extending from the top to beyond the midpoint of the cabinet, and a utility compartment 18 extending the rest of the way down the cabinet. The compartments 16 and 18 are separated from each other by a partition 20 suitably fixed to the inner walls of the cabinet 12.

Warm air is supplied to the warming and storage compartment 18 by a closed air heating system which includes first and second duct means 24 and 26 disposed in the warming and storage compartment 16 and forced air heating means 30 arranged in the utility compartment 18. The duct means 24 and 26 include flat metal plates 25 and 27 spanning the rear corners of the warming and storage compartment 16 thus defining a pair of ducts. The top portions of both plates 25 and 27 fit within flange pieces 28 suitably fixed to the ceiling of the cabinet. The bottom edges of both plates 25 and 27 abut the partition 20 which is provided with cutouts at the rear corners thereof so that a clear path exists between the ducts defined by plates 25 and 27 and the utility compartment 18. Plates 25 and 27 are provided with a series of openings 29 uniformly spaced along the longitudinal axes of the plates. Also, first duct means 24 is provided with a vent opening 31 which extends through the top of the cabinet 12. Vent opening 31 has a cover 32 pivotally mounted on the top of the cabinet. The length of each plate 24 and 26 is slightly less than the overall length of the warming and storage compartment 16 so that each plate may be raised within the confines of the flange pieces 28 and then turned out towards the front of the cabinet for easy and quick removal.

The forced air heating means 30 is arranged to communicate with the duct means, and includes a jet type gas burner 36 suitably connected with a source of gas, an electric motor driven blower 38 the inlet of which communicates with a combustion chamber 40 located below and communicating with second duct means 26. The outlet of blower 38 discharges into a chamber 42 disposed below and communicating with first duct means 24. Thus, the air flow pattern, as indicated by the arrows in FIG. 2 is from the first duct means 24 to the second duct means 26 through the combustion chamber 40 into the blower 38 and back again through the first duct means. A baffle 44 separates the gas burner 36 from the inlet of the blower 38 so that the gas flame does not enter the inlet. The gas burner 36 is provided with an ignition system 48 of any well known design. The temperature of the air is regulated by a thermostatic control 50, also of any well known design.

Trays of food are placed in food warmer 10 and are supported by tray holder 60 which is made up of three parallel circular plates 62, $a$, $b$ and $c$ held in place by three vertical strips 63. Suitable lugs 64 are fixed to strips 63 for bearing the food trays. Tray holder 60 is arranged to rotate within the cabinet 12 so that the food on the trays will be better exposed to the flow of heated air across the warming and storage compartment 24. The lower plate 62 is provided with a stub shaft 66 suitably arranged for rotation in a transversely extending strip 65 suitably supported in cabinet 12; the upper plate 26a is likewise provided with a stub shaft 67 suitably coupled to an electric drive motor 68 supported on top of cabinet 12. An on-off switch means 70 is mounted in the top front edge of cabinet 12 and is wired to drive motor 68 such that the motor 68 runs when the left door 14b is closed and stops running when the left door is opened. This feature allows food to be easily placed in or taken out of the cabinet 12. Switch means 70 may, of course, be appropriately arranged so that the drive motor 68 is turned on or shut off in response to the closing or opening of either or both of the doors 14a and b.

FIG. 6 illustrates another embodiment of the present invention, and includes basically the same elements of the food warmer just described, except that the rotating tray holder 60 is not included. Rather, fixed lugs 75 are provided in the interior wall of cabinet 12 and are suitably arranged for supporting food trays. In addition, the warmer of FIG. 6 includes a moisture control 80 for the heated air stream. Moisture control 80 can be any well known design, which would include a water supply line 81, water ejectors 82, drain line 83 and regulating means 84. Moisture control 80 may be used when warming dry foods such as bread, rolls or the like, which do not have any appreciable water content, or where the atmosphere around the warmer is extremely dry.

The closed heating system results in a food warmer which provides a moisture controlled heated air atmosphere for the food being warmed and stored. Most foods being stored will have its own supply of water and the moisture in the heated air will be picked up from the food. Since the heated air is continuously being recirculated the moisture content of the air remains stable. A small amount of heated air is vented from the cabinet and that air is made up by outside air entering into the flowstream through the utility compartment 18. Any moisture lost through the venting is compensated for, it is believed, by moisture in the make-up air and/or in the gas being burned. When the doors of the warmer are opened a certain amount of heated air is lost, but this loss is minimized by placing the air ducts at the rear of the cabinet and making the flow path of the air between these ducts. The make-up air for the air lost through the open doors is, however, quickly heated by the gas burner and after the doors are closed the desired temperature of the air will be rapidly reached. The air temperature should be maintained at about 160 degrees F. for moist foods and should not fall outside the range of 140–200 degrees F.

Although the heat source of the food warmer as described is gas, there is no reason why an electrical heater cannot be used. Electrical heaters of the type used today could not, however, provide air temperature control as accurately as a gas burner.

While I have shown and described certain present preferred embodiments of the present invention it is to be distinctly understood that the invention is not limited thereto but may be otherwise variously embodied within the scope of the following claims.

I claim:

1. A food warmer comprising: an upright cabinet having a food warming and storage compartment with an open front section and an adjacent utility compartment; door means on said cabinet for closing and opening said front section; support means in said cabinet disposed in said warming and storage compartment for supporting food trays, baskets, or the like; a closed forced air heating system including a forced air gas burning heat means and first and second duct means generally oppositely disposed to each other in said cabinet throughout at least a major portion of said warming and storage compartment and openly communicating with said utility compartment, each of said duct means including a plate member removably supported in said cabinet and enclosing a portion of the rear section of said warming and storage compartment with said plate members being provided with a series of uniformly spaced openings extending over a major portion of the surface thereof and arranged and sized such that a substantially uniformly pattern of air flows between said first and second duct means; said gas burned heat means being disposed in said utility compartment with the pressure side thereof communicating with said first duct means and the exhaust side thereof communicating with said second duct means for supplying heated air to said warning and storage compartment; and said support means including an elongated rack mounted in said warming and storage compartment for rotation about the longitudinal axis thereof, power drive means rotating said rack, and switching means operative with a door means and said drive means and responsive to the closing and opening of said door means to turn said drive means on and off, respectively.

2. A food warmer as set forth in claim 1 wherein at least said warming and storage compartment is rectangular or square in cross-section; and each of said duct means includes upwardly extending plate member removably supported in said cabinet and extending across and enclosing the corners at the rear section of said warming and storage compartment.

3. A food warmer as set forth in claim 1 wherein said warming and storage compartment and said utility compartment are disposed one on top of the other; and each of said duct means includes an upwardly extending plate member removably supported in said cabinet and enclosing a portion of the rear section of said warming and storage compartment; and wherein each of said ducts openly communicates at the lower end portion thereof with said utility compartment.

4. A food warmer as set forth in claim 1 including moisture control means operative with said forced air heating means for supplying and maintaining a desired amount of moisture into the heated air.

References Cited

UNITED STATES PATENTS

| | | | |
|---|---|---|---|
| 1,485,173 | 2/1924 | Eaton et al. | 107—60 |
| 2,524,272 | 10/1950 | Sage | 126—19 X |
| 2,949,525 | 8/1960 | Dunn | 99—339 X |
| 3,016,627 | 1/1162 | Freund | 107—60 UX |
| 3,030,486 | 4/1962 | Lashley | 99—234 R |
| 3,098,477 | 7/1963 | Lotter | 99—446 UX |
| 3,221,729 | 12/1965 | Beasley et al. | 99—450 X |
| 3,261,650 | 7/1966 | Stromquist | 126—21 A X |
| 3,324,844 | 6/1967 | Huffman | 126—21 A UX |
| 3,425,364 | 2/1969 | Martin | 107—60 |

WALTER A. SCHEEL, Primary Examiner

A. O. HENDERSON, Assistant Examiner

U.S. Cl. X.R.

99—427, 99—443; 126—21 A